United States Patent [19]
Thompson et al.

[11] Patent Number: 5,829,019
[45] Date of Patent: *Oct. 27, 1998

[54] COMPUTER NETWORK SERVER BACKUP WITH POSTED WRITE CACHE DISK CONTROLLERS

[75] Inventors: Mark J. Thompson, Sping; Randy D. Schneider, Spring, both of Tex.

[73] Assignee: Compaq Computer Corporation, Houston, Tex.

[*] Notice: The term of this patent shall not extend beyond the expiration date of Pat. No. 5,623,625.

[21] Appl. No.: 837,827

[22] Filed: Apr. 22, 1997

Related U.S. Application Data

[63] Continuation of Ser. No. 527,649, Sep. 13, 1995, Pat. No. 5,623,625.

[51] Int. Cl.⁶ .................................................. G06F 11/28
[52] U.S. Cl. .................... 711/113; 711/162; 395/182.02; 395/182.18
[58] Field of Search .................. 395/182.02, 182.18; 711/112, 113, 154, 161, 162

[56] References Cited

U.S. PATENT DOCUMENTS

| | | | |
|---|---|---|---|
| 4,506,323 | 3/1985 | Pusic et al. | 711/116 |
| 5,485,608 | 1/1996 | Lomet et al. | 395/182.18 X |

FOREIGN PATENT DOCUMENTS 06-052049  2/1994  Japan .

OTHER PUBLICATIONS

Vijayan, Jaikumar, "Vinca, Tricord offer low-cost fault tolerancce," Computerworld (Mar. 13, 1995) p. 53 ©1995 IBM Corp.

Katz, William F., "Five fault–tolerant products follow varied routes to goal of data security," PC Week (Jun. 27, 1994) ©1994 Ziff–Davis Publishing Co.

"NSI 7000 detects and replaces failed servers," PC Week (Jan. 10, 1994) ©1994 Ziff–Davis Publishing Co.

Wilson, Jayne, "Third parties offer LAN fault tolerance," InfoWorld (Dec. 13, 1993) ©1993 InfoWorld Publishing Co.

Smalley, Eric, "Alternative to SFT III permits coupling of dissimilar servers," PC Week (Nov. 8, 1993) ©1993 Ziff–Davis Publishing Co.

Rigney, Steve, "NetGuard's alternative to SFT III," PC Magazine (Oct. 12, 1993) ©1993 Ziff–Davis Publishing Co.

Shimmin, Bradley F., "SFT Level III protection, but without the big price tag," LAN Times (Oct. 4,1993) ©1993 McGraw–Hill, Inc.

Shimmin, Bradley F., "NSI 7250 Fail–Safe Subsystem: Netguard Systems, Inc.," LAN Times (Oct. 04, 1993) ©1993 McGraw–Hill, Inc.

"The IBM 3990 Disk Cache", Jai Menon, et al., Feb. 1988, pp. 146–151.

"No Modified Data Indicator For Caching Subsystem", IBM Tech. Disc. Bulletin, vol. 33, No. 2, Jul. 1990, pp. 301–302.

Francis, Bob, "Compaq Takes the High End," Infoworld ( 5) ©1995 Infoworld Publ. Co.

HP 9000 Corporate Business Server, ©1995 Hewlett–Packard Co.

*Primary Examiner*—David L. Robertson
*Attorney, Agent, or Firm*—Pravel, Hewitt & Kimball

[57] ABSTRACT

A computer system according to the invention includes a posted write cache for writing to a mass storage subsystem. Upon restart, the computer system determines whether the mass storage subsystem has been interveningly written to by another computer system since the computer system last wrote to that mass storage subsystem. If so, the computer system flushes its posted write cache, thus prevent invalid data from being written to the mass storage subsystem.

22 Claims, 6 Drawing Sheets

COMPUTER NETWORK SERVER BACKUP WITH POSTED WRITE CACHE DISK CONTROLLERS

SPECIFICATION

This application is a continuation of U.S. application Ser. No. 08/527,649 filed Sep. 13, 1995, issued as U.S. Pat. No. 5,623,625 on Apr. 22, 1997, which is hereby incorporated by reference.

BACKGROUND OF THE INVENTION

1. Field of the Invention

The invention pertains to computer network servers using backup servers for fault tolerance, and more specifically to a network server with a posted write disk cache and also with a backup server.

2. Description of the Related Art

Networked microcomputer systems are the future of the world of computing. Where once the mainframe dominated, supplying the computing needs for users throughout a large corporation, now groups of ever more powerful networked microcomputers satisfy those same computing needs. The networked microcomputer has invaded the realm of the mainframe, and now provides computing and communications between users for both large and small companies alike.

After microcomputer networks were developed, fault tolerant systems for such networks soon followed. Mainframe computers were renowned for their fault tolerance, being able to recover from a variety of system and power failures that could otherwise cripple a corporation's data processing. Those systems failed "gracefully" and then gracefully recovered from such failures.

As users have moved to microcomputer networks rather than mainframes, they have demanded similar fault tolerance. To this end, a number of systems now provide such fault tolerance. One example is the "backup" server. Computer networks typically centralize their storage in one or more network servers, which are generally powerful microcomputers running network operating systems (NOSs). These servers also typically have very large mass storage subsystems to store network data. A server failure could prevent the network users from being able to access that centralized data. To forestall this event, a number of fault tolerant network server systems have been developed, such as SFT III, or server fault tolerance level three, by Novell Corporation. Under SFT III, two identical servers run in tandem, each including an identical mass storage subsystem. The servers communicate through a fiber optic link to maintain concurrency, so if one server fails, the other continues providing the stored data to the network. While this technique is quite robust, it is also expensive. It requires at least twice the investment in hardware and software a single network server would otherwise require.

A number of other systems reduce such high costs. One example is a backup server that seizes control of a failed primary server's mass storage subsystem. Such a system is described in assignee's U.S. patent application Ser. No. 08/445,283, entitled MULTI-SERVER FAULT TOLERANCE USING IN-BAND SIGNALLING and filed May 19, 1995, which is hereby incorporated by reference. In that system, heartbeat messages are sent between a primary and backup server. If the primary server fails, the backup server then causes the primary server's mass storage subsystem to switch ports to the backup server. The backup server then provides the data on that mass storage subsystem to the network.

This system reduces costs because it only requires a single mass storage subsystem and because the backup server can be a less powerful—and less expensive—computer. Advanced mass storage subsystems typically have built-in redundancy, such as by using a RAID (redundant array of inexpensive disks) disk array system. So a mass storage subsystem failure is less likely than a server failure.

Another alternative system includes multiple active servers that can each seize control of the other server's storage subsystem should that other server fail. For example, two servers each provide network access to their own separate mass storage subsystems. Should one of the servers fail, the remaining running server seizes control of the other server's mass storage subsystem, then providing the data on both its own and the failed server's storage subsystem to the network users, albeit with reduced performance. Such a system is described in assignee's patent application Ser. No. 08/491,738, entitled FAULT TOLERANT MULTIPLE NETWORK SERVERS and filed Jun. 19, 1995, which is hereby incorporated by reference.

All of these systems, and a wide variety of other systems, provide fault tolerance while reducing costs and maximizing network computing capacity.

Such systems, however, typically use disk controllers to access data in their mass storage subsystems. Like networks, disk controllers have also evolved. One significant improvement in such controllers has been the addition of a "posted write" cache. When data is written to a disk controller, instead of that data being immediately written to the mass storage subsystem, it will sometimes be stored in the posted write cache. That data is later written to the mass storage subsystem during a period of inactivity, for example. Such systems reduce the demand on the bus used to communicate with the mass storage subsystem, and typically improve system performance. Such a system is described in assignee's patent applications Ser. Nos. 07/894,111, entitled METHOD AND APPARATUS FOR MAINTAINING AND RETRIEVING LIVE DATA IN A POSTED WRITE CACHE IN CASE OF POWER FAILURE, filed Jun. 5, 1992; and 08/402,731, entitled DISK DRIVE CONTROLLER WITH A POSTED WRITE CACHE MEMORY, filed Mar. 13, 1995; and in assignee's U.S. Pat. No. 5,408,644, entitled A METHOD AND APPARATUS FOR IMPROVING THE PERFORMANCE OF PARTIAL STRIPE OPERATIONS IN A DISK ARRAY SUBSYSTEM, which are hereby incorporated by reference.

Both of these developments reduce costs, improve resource utilization, increase performance, and otherwise improve the state of network computer art. It would be highly desirable to use these techniques together.

SUMMARY OF THE INVENTION

In a system according to the invention, a server with a posted write cache determines whether, since it has been restarted, another system has written to the first system's mass storage subsystem. If so, the first system flushes its posted write cache, preventing invalid data from overwriting valid data on the mass storage subsystem.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
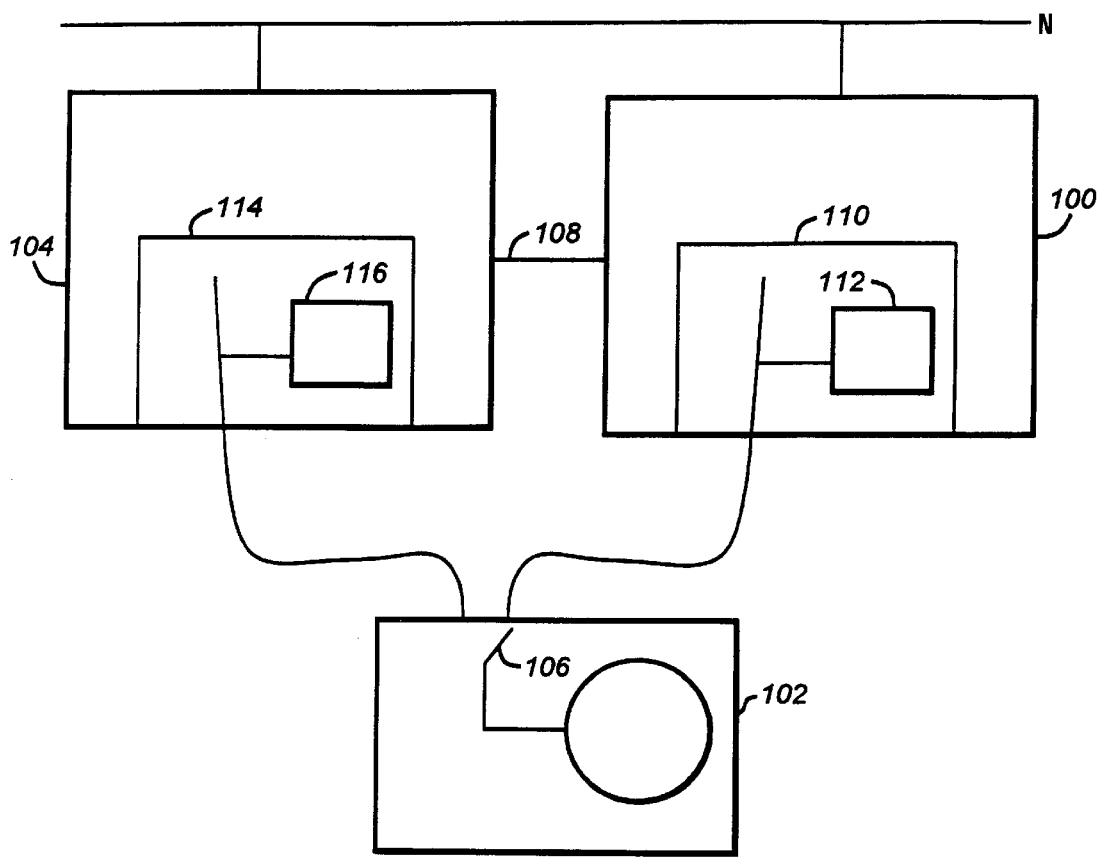
FIG. 1 is a block diagram of a system implemented according to the invention.

Turning now to the drawings, FIG. 1 is a block diagram illustrating the use of a disk controller with a posted write cache in conjunction with a primary/backup server according to the invention. A primary server 100 acts as a server on a network N, normally providing data from a mass storage subsystem 102. If the primary server 100 fails, then a backup server 104 sends a series of resets to the mass storage subsystem 102, causing the mass storage subsystem 102 to activate an internal switch 106, switching ports from the primary server 100 to the backup server 104. The backup server 104 then provides the data on the mass storage subsystem 102 to the network N until the primary server 100 is repaired. The backup server 104 and primary server 100 also preferably communicate via a serial link 108. Such a primary/backup server configuration is further described in U.S. Ser. No. 08/445,283, previously incorporated by reference. Various other schemes for using active multiserver backups are further described in U.S. Ser. No. 08/491,738, also previously incorporated by reference. Although the scheme discussed here is directed to a primary/backup server system, it is equally applicable to two active servers providing backup according to Ser. No. 08/491,738.

The primary server 100 includes a controller 110 for controlling the mass storage subsystem 102. Preferably, the mass storage subsystem 102 is a RAID array using the switching technology of the above-incorporated applications. Thus, the controller 110 would preferably be a SCSI disk controller that controls a RAID array forming the mass storage subsystem 102. Of course, a wide variety of other mass storage subsystems could also be used, such as magnetic tape or writable optical disk, as well as a wide variety of other buses, such as fiber optic.

According to the preferred embodiment, the controller 110 includes a posted write cache 112. This posted write cache 112 preferably includes battery backup, so should the primary server 100 fail, any pending writes in the posted write cache would be retained until the primary server 100 was restored to normal operation. Such posted write cache controllers are further described in U.S. patent applications Ser. Nos. 07/894,111; 08/402,731; and U.S. Pat. No. 5,408,644, which are all previously incorporated by reference. Similarly, the backup server 104 includes a controller 114, which may or may not include a posted write cache 116.

Figure 2A:
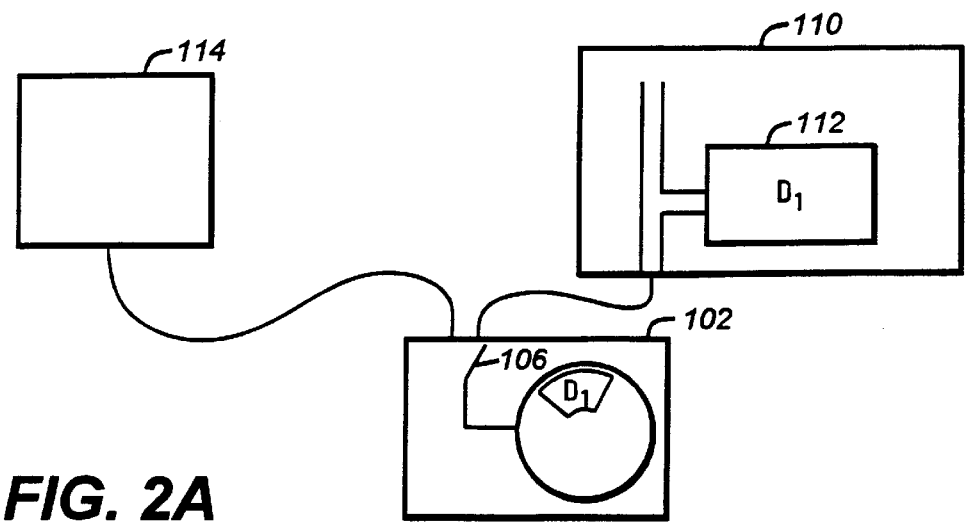
FIGS. 2A–2C are block diagrams illustrating the operation of a system implemented according to the invention.

The Problem of Using A Posted Write Cache with a "Migrating" Mass Storage Subsystem Such a system illustrated in FIG. 1, however, presents a problem. Suppose, for example, the primary server 100 is operating normally, with the backup server 104 receiving heartbeat messages over the serial link 108 from the primary server 100. Further, the primary server 100 has posted data in the posted write cache 112 for subsequently transmitting to the mass storage subsystem 102. This situation is illustrated in FIG. 2A, where the posted write cache 112 is illustrated as containing certain data $D_1$ for writing to the mass storage subsystem 102. This data, although held in the posted write cache 112, is effectively dedicated to a certain location in the mass storage subsystem 102, here illustrated as a particular block shown as $(D_1)$ within the mass storage subsystem 102. If the primary server 100 were gracefully shut down, the data in the posted write cache 112 would be written to the mass storage subsystem 102 which would store the data $D_1$ in the appropriate location $(D_1)$.

Figure 2B:
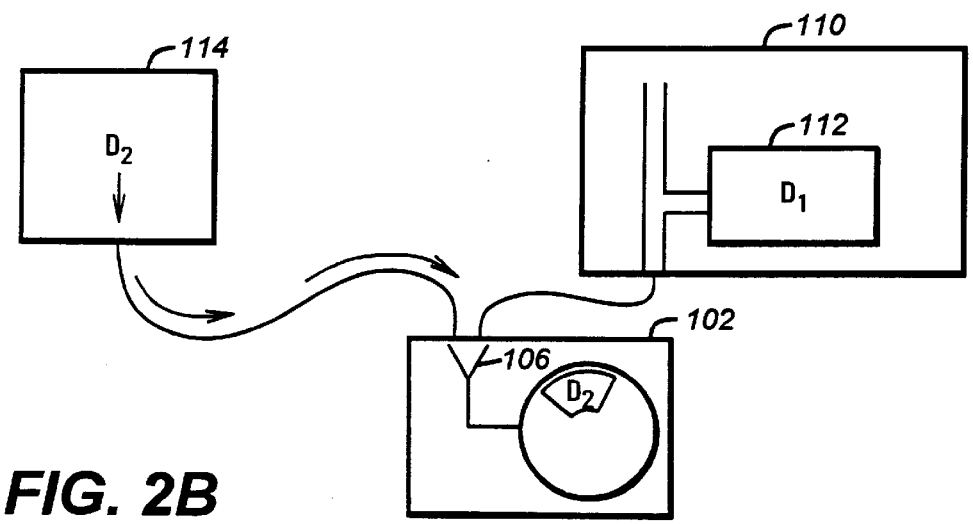

Suppose, however, that the primary server 100 is not gracefully shut down, but instead fails. In this case, the backup server 104 sends a series of resets to the mass storage subsystem 102, which then switches the switch 106 to the backup controller 114, as illustrated in FIG. 2B.

The condition of the servers at this point is of interest. The controller 110 is no longer coupled to the mass storage subsystem 102, but it does still contain the data $D_1$ intended for the location $(D_1)$ in the mass storage subsystem 102. Further, this data $D_1$ is battery backed up, so it will be available for writing when the primary server 100 is repaired and rebooted. But while the primary server 102 is down, the backup server 104 typically performs a data integrity check of the mass storage subsystem 102, and may detect the missing data. At some point in this data integrity check, or later during normal operation of the backup server 104, a second group of data $D_2$ is written to the mass storage subsystem 102, in this case to the location $(D_1)$ that was intended to be occupied by the data $D_1$. This is illustrated in FIG. 2B.

Figure 2C:
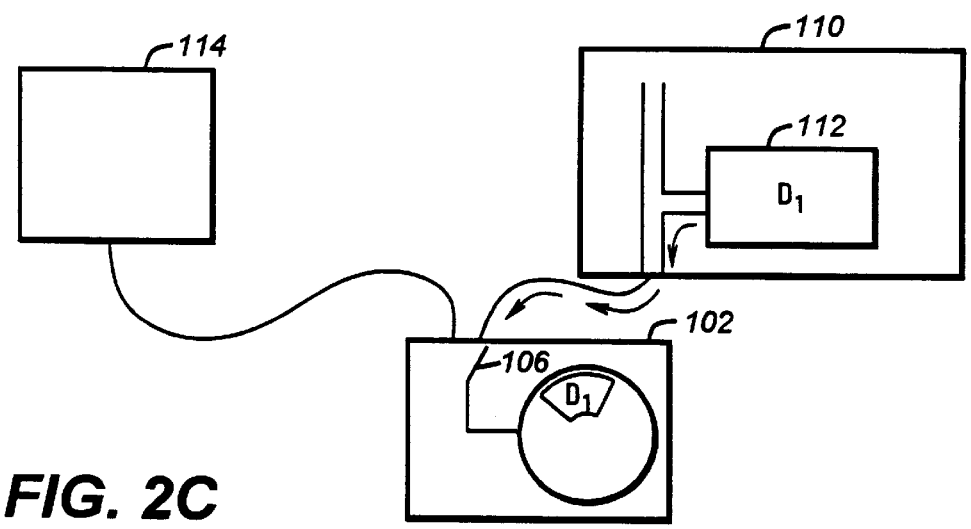

The problem occurs when the primary server 100 is repaired and rebooted. The situation that can arise is illustrated in FIG. 2C. The primary server 100 has been repaired and rebooted, the mass storage subsystem 102 has switched its internal switch 106 back to the primary server 100, and the controller 110 now controls the mass storage subsystem 102. But, the controller 110 still holds the data $D_1$ in its posted write cache 112, and that data is earmarked for the location $(D_1)$ in the mass storage subsystem 102—a location now occupied by the data $D_2$ from the backup server 104. The controller 102 then writes this data to the mass storage subsystem 102, overwriting the data $D_2$ and corrupting the integrity of the mass storage subsystem 102.

Preferably, when the backup server 104 assumes control from the failed primary server 100, any data the primary server 100 has not written to the mass storage subsystem 102 should be considered lost. This may require the reentry of records by a network end user, but once the backup server 104 is operating, the integrity of the data on the mass storage subsystem 102 will have been checked, verified, and corrected if necessary. Thus, when the primary server 100 resumes control, it does so with a mass storage subsystem 102 that has valid data. But when the controller 110 overwrites the data in the mass storage subsystem 102 with the data in its posted write cache 112, this corrupts the delta on the mass storage subsystem 102.

A Solution According to the Invention

A system implemented according to the invention addresses this problem. One solution would be to turn off the posted write cache 112 during normal operation, but this would eliminate the performance gains of such a cache. Another solution would be to turn off the battery backup for the posted write cache 112, but then the primary server 100 could lose data when the backup server 104 was not used.

Instead, the preferred embodiment addresses the problem by checking the mass storage subsystem 102 for intervening writes. That is, the controller 110 first determines whether the mass storage subsystem 102 has been written to by another system (in this case the backup server 104) since the controller 110 last wrote to that mass storage subsystem.

Figure 3:
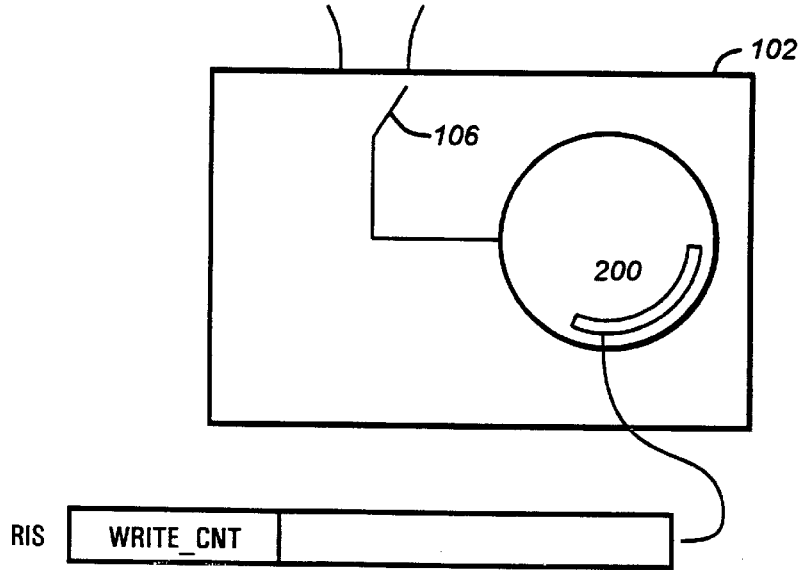
FIG. 3 is a block diagram illustrating redundant information sectors in a mass storage subsystem implemented according to the invention.

Turning to FIG. 3, a portion of the technique used to accomplish this is illustrated. The mass storage subsystem 102 preferably includes "redundant information sectors," or RIS 200. The RIS 200 is a group of sectors or blocks within the media of the mass storage subsystem 102 that the controllers 110 and 114 can write to and read from. The RIS 200 generally stores the status of the mass storage subsystem 102. The RIS 200 contains a number of updates counter UPDATE_CNT. UPDATE_CNT indicates the number of times the RIS 200 has been updated since the mass storage subsystem 102 was first configured. It is generally four bytes, so it only rolls over after a very long period of time—generally longer than the life of the mass storage subsystem 102.

To prevent corrupting data on a restart of the primary server 100, the controller 110 stores the value of UPDATE_CNT within a battery backed up random access memory (RAM) location in the posted write cache 112. On restart, the controller 110 compares that stored value to the corresponding value within the RIS 200 itself. Referring to FIG. 2A, suppose that UPDATE_CNT has been stored in the posted write cache 112 as being 1,000, meaning the RIS 200 had been updated 1,000 times since configuration. This would correspond to UPDATE_CNT within the RIS 200 equalling 1,000.

Now suppose in FIG. 2B that the backup server 104 updates the RIS 200. This will increment UPDATE_CNT within the RIS 200 to 1,001. Then, suppose that the primary server 100 is repaired and restarted. On restart, the firmware within the primary controller 110 reads UPDATE_CNT (now 1,001) from the RIS 200. That value is greater than the value of 1,000 stored within the posted write cache 112 when the controller 110 last updated the RIS 200 in the mass storage subsystem 102. Therefore, the controller 110 recognizes that the mass storage subsystem 102 has been accessed since the controller 110 last accessed it. So instead of writing the data within its posted write cache 112 to the mass storage subsystem 102, the controller 110 according to the invention instead flushes that posted write cache 112, preventing the battery backed up data from corrupting the data within the mass storage subsystem 102.

In this way, a primary/backup server configuration can be used with a posted write cache. If the primary server 100 fails, data within its posted write cache 112 will not subsequently corrupt the data within the mass storage subsystem 102, even if that mass storage subsystem 102 has been written to by the backup server 104. The data is instead flushed.

It will be appreciated that how the controller 110 determines whether the mass storage subsystem 102 has been written to since last accessed by, that controller 110 can be modified without detracting from the spirit of the invention. For example, rather than using the RIS 200 within the mass storage subsystem 102, data indicating intervening writes could be maintained in a separate register within a firmware controller of the mass storage subsystem 102. The controller 110 could interrogate that register to see whether the mass storage subsystem 102 has been accessed while connected to a server other than itself. A second technique could involve storing a unique signature of the controller 110 or the primary server 100 in the mass storage subsystem 102. Manufacturers often provide such a unique identification in cards such as controller cards. Then, on restart, the primary server 100 verifies that it was the last system to access the mass storage subsystem 102. A wide variety of other techniques are possible to determine whether the mass storage subsystem 102 has had intervening accesses will be apparent to one of ordinary skill in the art. Thus, the means for determining whether the mass storage subsystem 102 has been accessed is not limited to examining the RIS 200 of the mass storage subsystem 102.

Software

Figure 4:
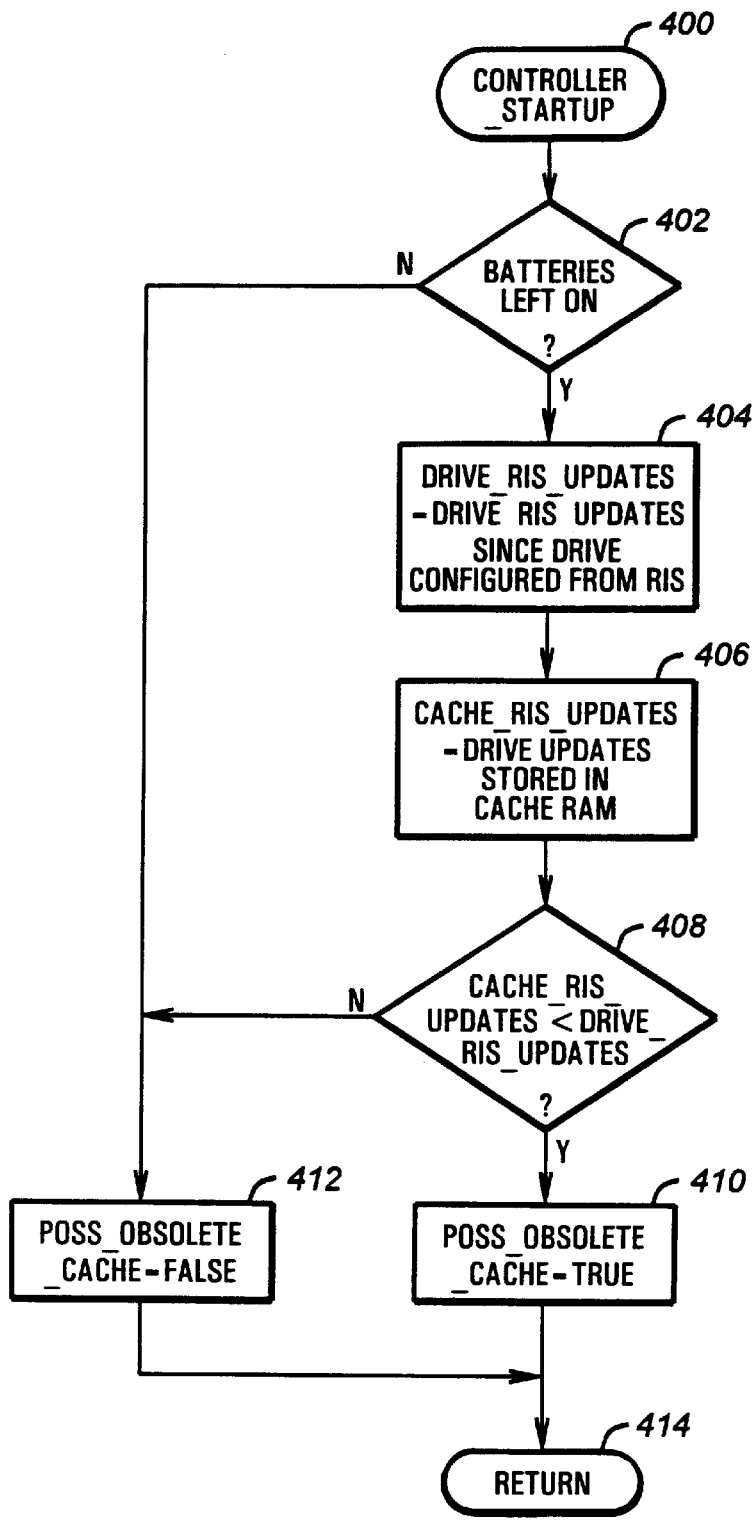
FIG. 4 is a controller startup routine that determines whether the mass storage subsystem has been interveningly written to according to the invention.

Turning to FIGS. 4–7, shown are flowcharts of software and firmware used to implement the cache flushing according to the invention. FIG. 4 illustrates a CONTROLLER_STARTUP routine 400, which is preferably implemented in firmware of the controller 110. This firmware is preferably held in a Flash electrically erasable programmable read only memory (EEPROM), so that it can be easily modified.

When the controller 110 is powered up, the CONTROLLER_STARTUP routine 400 is executed as part of the various startup procedures of the controller 110. Generally, the CONTROLLER_STARTUP routine 400 determines whether the mass storage subsystem 102 has been updated since the controller 110 was last reset. If so, any data within the posted write cache 112 of the controller 110 is potentially invalid.

Beginning at step 402, the CONTROLLER_STARTUP routine 400 first determines whether the batteries within the controller 110 were left on since the previous restart. If the batteries have been left on, any data within the posted write cache 112 has been preserved since the last reset, and this data could potentially be invalid. If the batteries have been instead turned off or removed, no data has been preserved in the posted write cache 112, so no invalid data remains in the posted write cache 112.

As previously mentioned, one potential solution to eliminate writing invalid data in the posted write cache 112 to the mass storage subsystem 102 is to remove the batteries from the battery backup for the posted write cache 112. Then, however, any data within the posted write cache 112 would be lost even when the mass storage subsystem 102 was not subsequently accessed by a different system. This is undesirable because it eliminates the feature of a battery backed up posted write cache 112.

If at step 402 the batteries have been left on, invalid data may remain in the posted write cache 112, so control proceeds to step 404, where a variable DRIVE_RIS_UPDATES is loaded with the value of UPDATE_CNT stored in the RIS 200 on the mass storage subsystem 102. This is typically done by reading the RIS 200 from the mass storage subsystem 102. After step 404, DRIVE_RIS_UPDATES then contains the number of updates of the RIS 200 since the mass storage subsystem 102 was first configured.

Proceeding to step 406, a variable CACHE_RIS_UPDATES is loaded with the corresponding saved UPDATE_CNT value in the battery backed up RAM in the posted write cache 112. As discussed below in conjunction with FIG. 7, during normal operation, the RAM of the posted write cache 112 is updated with the UPDATE_CNT value from the RIS 200, indicating the number of updates since configuration. If the value stored in the RAM equals the UPDATE_CNT value in the RIS 200 itself, the RIS 200 has not been updated (i.e., the drive has not been written to) since the controller 110 last accessed the mass storage subsystem 102.

Proceeding to step 408, CACHE_RIS_UPDATES is compared to DRIVE_RIS_UPDATES. If CACHE_RIS_

UPDATES is less than DRIVE_RIS_UPDATES, then the RIS 200 has been updated since the controller 110 has last accessed the mass storage subsystem 102. If so, control then proceeds to step 410, where a flag POSS_OBSOLETE_CACHE is set true, indicating that the posted write cache 112 may contain obsolete cache data. If at step 408 CACHE_RIS_UPDATES is not less than DRIVE_RIS_UPDATES, the mass storage subsystem 102 has not been written to and its RIS 200 not updated since the controller 110 was last reset, so control instead proceeds to step 412, where POSS_OBSOLETE_CACHE is set false to indicate that any cache data within the posted write cache 112 is still valid and can be written to the mass storage subsystem 102. Similarly, if the batteries ware not left on, control proceeds from step 402 to step 112, as the posted write cache 112 does not contain invalid (or any, for that matter) write data.

Control then proceeds from steps 410 and 412 to step 414, where the CONTROLLER_STARTUP routine 400 returns to the other startup software within the controller 110.

Figure 5:
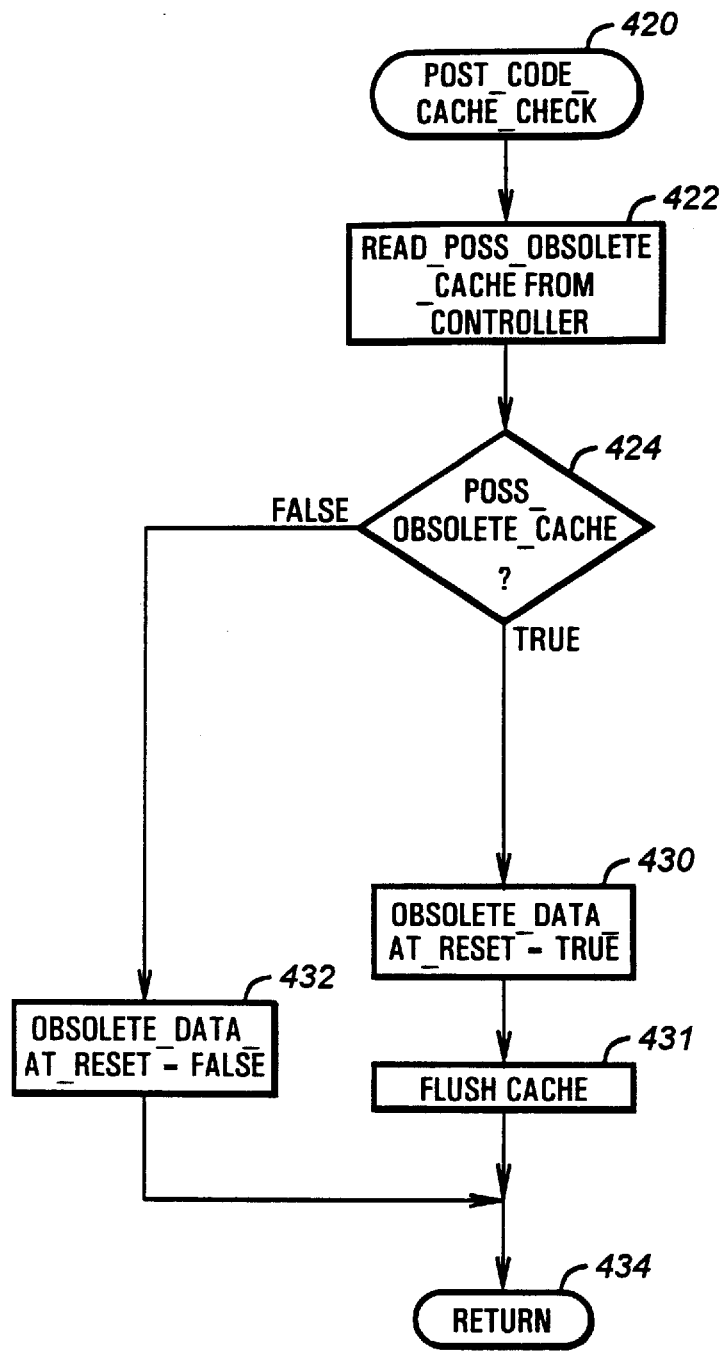
FIG. 5 is a post code cache check subroutine that determines whether to flush old cache data.

Turning to FIG. 5, a flowchart is shown illustrating power-on self-test (POST) code of the primary server 100. This particular code uses the flag POSS_OBSOLETE_CACHE as set by the firmware of the controller 110 in FIG. 4. Illustrated is a POST_CODE_CACHE_CHECK routine 420, which is called by the POST code to determine whether the posted write cache 112 may contain obsolete data. Beginning at step 422, POSS_OBSOLETE_CACHE is read from the controller 110. This is typically done using an internal bus communications protocol well-known to the art.

POSS_OBSOLETE_CACHE having been obtained, control then proceeds to step 424, where POSS_OBSOLETE_CACHE is tested. If it is true, then UPDATE_CNT within the RIS 200 differed from the corresponding value stored in the RAM of the posted write cache 112, and thus data within the posted write cache 112 may be invalid. Control then proceeds to step 430, where a flag OBSOLETE_DATA_AT_RESET is set to true, indicating that the data within the posted write cache 112 is invalid.

Control then proceeds to step 431, where data in the posted write cache 112 is then flushed (discarded). That is, when power last failed, writes may have been pending in the posted write cache 112 to the mass storage subsystem 102. These pending writes are invalidated, for example, by setting an appropriate flag for each block that is posted for writing to the mass storage subsystem 102. In this way, these pending writes will be ignored, or "flushed," and will not overwrite valid data within the mass storage subsystem 102.

If POSS_OBSOLETE_CACHE is false at step 424, indicating the posted write cache 112 data is not invalid, control proceeds from step 424 to step 432, where OBSOLETE_DATA_AT_RESET is set to false.

From steps 431 and 432, control proceeds to step 434, where the POST_CODE_CACHE_CHECK routine 420 returns to other post code within the primary server 100.

Figure 6:
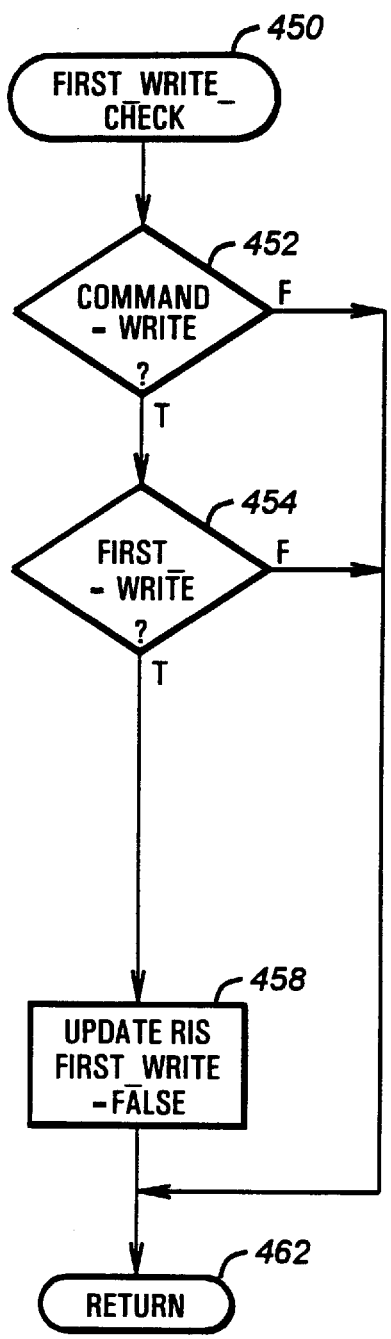
FIG. 6 is a cache transfer routine that flushes cache data if the cache data is invalid.

Turning to FIG. 6, a flowchart illustrates how a first write check is performed by the controller 110.

Specifically, a FIRST_WRITE_CHECK routine 450 is illustrated, preferably implemented within the firmware of the controller 110. This FIRST_WRITE_CHECK routine 450 is called on every command to the controller 110. As a preliminary matter, the initialization code of the controller 110 sets a variable FIRST_WRITE to true on initialization, so that when the FIRST_WRITE_CHECK routine 450 is entered for the first time, FIRST_WRITE is set to true. Control of the FIRST_WRITE_CHECK routine 450 begins at step 452, where the command to be executed is checked for a "write" command. Other potential commands are read commands, status commands, etc., pertaining to transfers of data between the posted write cache 112 and the mass storage subsystem 102. If the command at step 452 is a write, control proceeds to step 454, where FIRST_WRITE is tested. If true, this is the first write since the controller 110 was reset and control proceeds to step 458.

At step 458, two steps are executed. First, the RIS is updated by calling an UPDATE_RIS routine 480, discussed below in conjunction with FIG. 7. This generally means that WRITE_CNT of the RIS 200 is incremented. Also at step 458, FIRST_WRITE is set false, so the next time the FIRST_WRITE_CHECK routine 450 is called, it will not again update the RIS.

From step 452 if the command was not a "write," from step 454 if this was not the first write, and from step 458 in all cases, control proceeds to step 462, where control returns to the calling program. There, other processing is executed to implement any commands needed, such as transfers between the posted write cache 112 and the mass storage subsystem 102.

Figure 7:
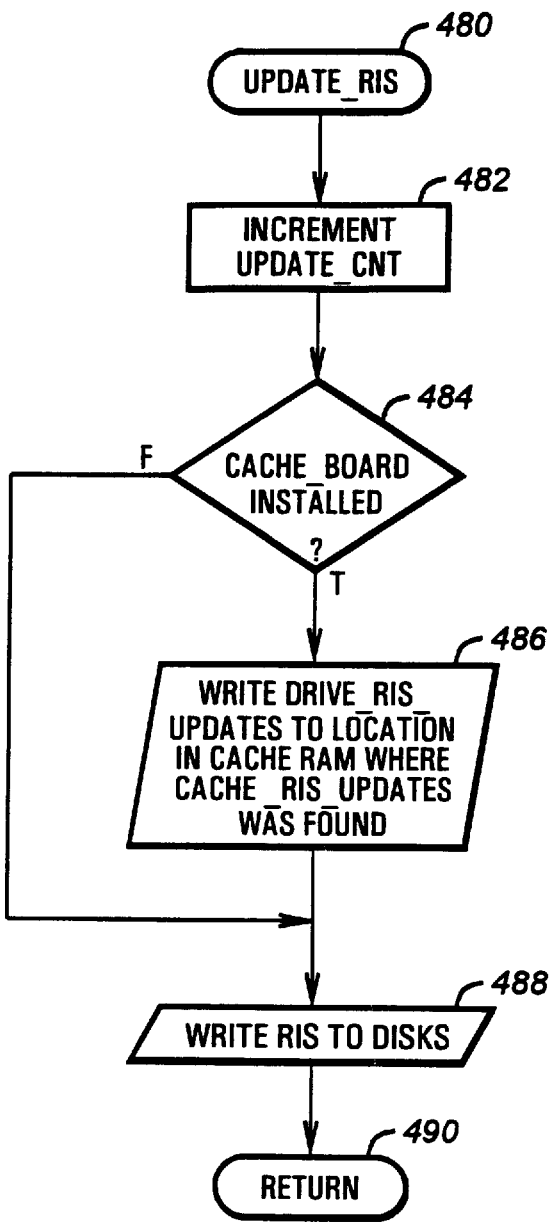
FIG. 7 is an update RIS subroutine that updates the redundant information sectors on a mass storage subsystem according to the invention.

Turning to FIG. 7, a flowchart illustrates how the RIS 200 and the RAM data in the posted write cache 112 are updated. This is performed by an UPDATE_RIS routine 480. The UPDATE_RIS routine 480 is preferably implemented in the controller 110. It updates the RIS 200 when described above in step 458 and at other appropriate times.

Beginning at step 482, the UPDATE_RIS routine 480 first increments UPDATE_CNT, which has been read from the RIS 200. UPDATE_CNT is incremented to indicate that the RIS 200 is being updated, and the value represents the number of times the RIS 200 has been updated since that mass storage subsystem 102 was first configured.

Proceeding to step 484, it is determined whether the controller 110 has a posted write cache 112 installed. If so, then the battery backed up RAM in that posted write cache 112 must also be updated to reflect the current value of UPDATE_CNT. Therefore, control proceeds to step 486, where a value is stored in the battery backed up RAM of the posted write cache 112 corresponding to UPDATE_CNT. This corresponds to the location read at step 405 of FIG. 4.

Control then proceeds from step 484 if no cache board is installed, and from step 486 in any case, to step 488, where the new RIS 200 is written to the disks of the mass storage subsystem 102. It will be appreciated that after step 488, thus number of RIS updates since configuration held by UPDATE_CNT within the RIS 200 will correspond to the value stored in the battery backed up RAM of the posted write cache 112.

Control then proceeds from step 488 to step 490, where the UPDATE_RIS routine 480 returns to other RIS processing software within the controller 110.

Operation

If the backup server 104 seizes control of the mass storage subsystem 102, it will increment UPDATE_CNT in the RIS 200. When the primary server 100 again resumes control, the corresponding value stored in the RAM of the posted write cache 112 will be less than the value of UPDATE_CNT stored in the RIS 200. This will cause POSS_OBSOLETE_CACHE to be set to true at step 410 of FIG. 4, allowing the operator to flush the cache as indicated in FIG. 5.

One potential concern is if the backup server 104 similarly implements its own posted write cache 116. In this case, the UPDATE_CNT value it may have stored in its posted write cache 116 may be less than the corresponding value of UPDATE_CNT stored in the RIS 200, because the primary server 100 will have been accessing the mass storage subsystem 102 and updating the RIS 200. Data in the backup server 104 posted write cache 116 will automatically be flushed using the same mechanism described above.

Other Applications

This technique for determining the validity of the data in a posted write cache also finds application in a number of other situations. For example, a user may manually move the mass storage subsystem 102 to a different server if the primary server 100 should fail. By keeping track of intervening accesses when it is again reconnected to the primary server 100 with its posted write cache 112, the potential for writing invalid data from the posted write cache 112 to the mass storage subsystem 102 is eliminated.

Second, although a primary/backup server configuration has been shown, similar techniques can be used for two active backup servers, where each has its own mass storage subsystem but is capable of seizing control of the other server's mass storage subsystem. Again, using the techniques discussed above, invalid data within the failed server's posted write cache is flushed, rather than overwritten onto valid data within the mass storage subsystem.

Finally, although a RAID array has been shown as making up the mass storage subsystem, a variety of other devices can be similarly used with a posted write cache according to the invention. These include optical storage media, magnetic tape drives, and virtually any other storage media that has the potential for being overwritten with invalid data.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A storage system controller for use with a computer and a mass storage subsystem, the storage system controller comprising:

a microcontroller for executing code;

microcontroller executable code that when executed by said microcontroller determines whether the mass storage subsystem has been written to since a most recent writing of data to the mass storage subsystem; and a posted write cache for holding data from the computer for intended storage in the mass storage subsystem, the posted write cache including cache flush logic that flushes the cache in response to said microcontroller executable code determining that the mass storage subsystem has been written to.

2. The controller of claim 1, wherein said posted write cache further includes a battery backed-up variable indicating the number of mass storage subsystem updates since reset, wherein the mass storage subsystem includes a value indicating the number of updates since reset, and wherein said microcontroller executable code further comprises:

reading code that when executed reads from the mass storage subsystem said storage subsystem number of updates since reset; and comparison code that when executed compares the battery backed-up variable with the number of updates since reset with the storage subsystem number of updates since reset, and if the battery backed-up variable is less, determines that the mass storage subsystem has been written to since the most recent writing of data to the mass storage subsystem.

3. The controller of claim 2, wherein said reading code reads from redundant information sectors (RIS) of the mass storage subsystem.

4. The controller of claim 2, wherein said reading code reads from redundant array of inexpensive disks (RAID) of the mass storage subsystem.

5. A system for providing server back-up of a server with a posted write cache, the system comprising:

a first server with a posted write cache;

a second server for providing back-up for said first server;

a mass storage subsystem selectively coupled to the first server and the second server;

a microcontroller for executing code in said first server;

microcontroller executable code that when executed by said microcontroller determines whether the second server has written to the mass storage subsystem since the first server has written to the mass storage subsystem; and cache flush logic in said posted write cache responsive to said microcontroller executable code.

6. The system of claim 5, wherein said first server further includes a battery backed-up variable indicating the number of mass storage subsystem updates since reset, wherein the mass storage subsystem includes a value indicating the number of updates since reset, and wherein said microcontroller executable code further comprises.

reading code that when executed reads from the mass storage subsystem said storage subsystem number of updates since reset; and comparison code that when executed compares the battery backed-up variable with the number of updates since reset with the storage subsystem number of updates since reset, and if the battery backed-up variable is less, determines that the mass storage subsystem has been written to since the most recent writing of data to the mass storage subsystem.

7. The system of claim 6, wherein said reading code reads from redundant information sectors (RIS) of the mass storage subsystem.

8. The system of claim 6, wherein said reading code reads from redundant array of inexpensive disks (RAID) of the mass storage subsystem.

9. The system of claim 5, wherein said mass storage subsystem includes an internal bus, a first port, and a second port, said mass storage subsystem including relays for coupling the internal bus to the second port in response to a predetermined in-band signal being received by said mass storage subsystem over the second port.

10. The system of claim 9, wherein said first server is coupled to the first port of said mass storage subsystem and provides an indication that is has failed;

wherein said second server is coupled to the second port of said mass storage subsystem and to said first server; and wherein said second server provides the predetermined in-band signal to the second port upon receiving the indication that said first server has failed.

11. The system of claim 5, wherein said first server is a primary server and wherein said second server is a backup server.

12. The system of claim 5, wherein said first server is a primary server and wherein said second server is a primary server.

13. A server for use with a mass storage subsystem, the server comprising:

a processor for running an operating system;

a video subsystem coupled to said processor;

memory coupled to said processor for storing data and code; and a storage system controller coupled to said processor and said memory, the storage system controller comprising:

a microcontroller for executing code;

microcontroller executable code that when executed by said microcontroller determines whether the mass storage subsystem has been written to since a most recent writing of data to the mass storage subsystem; and a posted write cache for holding data from the computer for intended storage in the mass storage subsystem, the posted write cache including cache flush logic that flushes the cache in response to said microcontroller executable code determining that the mass storage subsystem has been written to.

14. The server of claim 13, wherein said posted write cache further includes a battery backed-up variable indicating the number of mass storage subsystem updates since reset, wherein the mass storage subsystem includes a value indicating the number of updates since reset, and wherein said microcontroller executable code further comprises:

reading code that when executed reads from the mass storage subsystem said storage subsystem number of updates since reset; and comparison code that when executed compares the battery backed-up variable with the number of updates since reset with the storage subsystem number of updates since reset, and if the battery backed-up variable is less, determines that the mass storage subsystem has been written to since the most recent writing of data to the mass storage subsystem.

15. The server of claim 14, wherein said reading code reads from redundant information sectors (RIS) of the mass storage subsystem.

16. The server of claim 14, wherein said reading code reads from redundant array of inexpensive disks (RAID) of the mass storage subsystem.

17. The server of claim 14, wherein said mass storage subsystem includes an internal bus, a first port, and a second port, said mass storage subsystem including relays for coupling the internal bus to the second port in response to a predetermined in-band signal being received by said mass storage subsystem over the second port.

18. A server for use with a mass storage subsystem, the server comprising:

a processor for running an operating system;

a Basic Input/Output System (BIOS) for handling communications involving said processor;

memory coupled to said processor for storing data and code; and a storage system controller coupled to said processor and said memory, the storage system controller comprising:

a microcontroller for executing code;

microcontroller executable code that when executed by said microcontroller determines whether the mass storage subsystem has been written to since a most recent writing of data to the mass storage subsystem; and a posted write cache for holding data from the computer for intended storage in the mass storage subsystem the posted write cache including cache flush logic that flushes the cache in response to said microcontroller executable code determining that the mass storage subsystem has been written to.

19. The server of claim 18, wherein said posted write cache further includes a battery backed-up variable indicating the number of mass storage subsystem updates since reset, wherein the mass storage subsystem includes a value indicating the number of updates since reset, and wherein said microcontroller executable code further comprises:

reading code that when executed reads from the mass storage subsystem said storage subsystem number of updates since reset; and comparison code that when executed compares the battery backed-up variable with the number of updates since reset with the storage subsystem number of updates since reset, and if the battery backed-up variable is less, determines that the mass storage subsystem has been written to since the most recent writing of data to the mass storage subsystem.

20. The server of claim 19, wherein said reading code reads from redundant information sectors (RIS) of the mass storage subsystem.

21. The server of claim 19, wherein said reading code reads from redundant array of inexpensive disks (RAID) of the mass storage subsystem.

22. The server of claim 19, wherein said mass storage subsystem includes an internal bus, a first port, and a second port, said mass storage subsystem including relays for coupling the internal bus to the second port in response to a predetermined in-band signal being received by said mass storage subsystem over the second port.

* * * * *